United States Patent [19]
Kubota et al.

[11] Patent Number: 5,962,357
[45] Date of Patent: Oct. 5, 1999

[54] TAPHOLE MIX FOR MOLTEN METAL TAPHOLE

[75] Inventors: Yukitoshi Kubota; Hidetoshi Wada; Yoshiyuki Nobuoka, all of Hiroshima, Japan

[73] Assignee: Shinagawa Refractories Co., Ltd., Tokyo, Japan

[21] Appl. No.: 09/083,997

[22] Filed: May 26, 1998

[30] Foreign Application Priority Data

May 26, 1997 [JP] Japan ..................................... 9-135272

[51] Int. Cl.⁶ ................................................... C04B 35/52
[52] U.S. Cl. ................................. 501/99; 501/90; 501/92; 501/97.1; 501/100
[58] Field of Search ............................... 106/284; 501/90, 501/92, 97.1, 99, 100, 101

[56] References Cited

U.S. PATENT DOCUMENTS

| | | | |
|---|---|---|---|
| 4,017,316 | 4/1977 | Renkey et al. | 106/284 |
| 4,282,039 | 8/1981 | Bullough | 106/284 |
| 4,399,982 | 8/1983 | Henry, Jr. | 266/45 |
| 5,324,352 | 6/1994 | Hughes et al. | 106/284 |

*Primary Examiner*—Karl Group
*Attorney, Agent, or Firm*—Wenderoth, Lind & Ponack, L.L.P.

[57] ABSTRACT

The object of the present invention is to provide a taphole mix for use in a molten metal taphole which has improved resistance to both wear and corrosion and enables prolonged tapping of iron and reduces difficult drilling. The taphole mix of the present invention is characterized in that it comprises a refractory base material in an amount of 65 to 92 wt % and a binder in an amount of 8 to 35 wt %, the binder consisting of an anhydrous coal tar having a fixed carbon content of 32.5 wt % or above.

2 Claims, No Drawings

TAPHOLE MIX FOR MOLTEN METAL TAPHOLE

BACKGROUND OF THE INVENTION

1. Field of the Invention

The present invention is directed to a taphole mix for a molten metal discharge port which is used under a reducing atmosphere at a port for discharging a molten metal, for instance, in a blast furnace, an electric furnace and the like.

2. Prior Art

Certain materials have heretofore been known and employed as taphole mixes for use in a molten metal discharge port in which a principal base material composed of ROSEKI, chamotte and/or alumina is mixed and kneaded with a silicon carbide, a carbonaceous material, a Ferro-silicon nitride and the like and a clay, and further in which a coal tar having a fixed carbon content of not more than 31.5% is used as a binder. In regard to the coal tar noted here, a grade with a fixed carbon content of about 27 to 31% (100 to 400 cp viscosity at 60° C.), is commercially available but grades of 31.5% or more in fixed carbon content have not yet been obtained commercially and hence have not been used to date.

Nevertheless, in order to prolong the tapping time of molten iron, it is important that a taphole mix for use in a molten metal taphole should be resistant to both wear and corrosion from the molten iron and associated slag. However, the above conventional taphole mixes are not satisfactory with respect to these physical properties. Japanese Patent Laid-Open No. 1-108170, for example, discloses a taphole mix for use in a molten iron taphole in a blast furnace, characterized in that such taphole mix comprises an alumina material in an amount of 30 to 58 wt %, a magnesia-alumina spinel material in an amount of 10 to 30 wt % and a carbon material in an amount of 10 to 20 wt %, a ferrosilicon as a bonding agent in an amount of 3 to 10 wt %, a clay in an amount of 3 to 10 wt % and an anhydrous tar as a binder in an amount of 10 to 20 wt %. Although capable of exhibiting improved corrosion resistance, this known taphole mix does not have enough strength to attain excellent wear resistance.

Furthermore, Japanese Patent Publication No. 57-23675 discloses a taphole mix for a molten iron taphole in a blast furnace, characterized in that such taphole mix comprises an inorganic composition derived by mixing a coke in an amount of less than 40 wt %, a silicon carbide in an amount of 5 to 40 wt %, a ROSEKI in an amount of 10 to 50 wt % and a silicon alloy in an amount of 2 to 10 wt %, the silicon alloy having a silicon metal content of more than 75%, and then adding and mixing a phenolic resin solution in an organic solvent in an amount of 10 to 35 wt % to the composition. However, this known taphole mix does not have sufficient low-temperature strength, or satisfactory low-temperature wear resistance. A further problem with this taphole mix is that due to a rather large difference in strength at high- and low-temperatures, the mix is prone to crack during drilling so that drilling becomes difficult.

Accordingly, the object of the present invention is to provide a taphole mix for use in a molten metal taphole which exhibits improved wear resistance and corrosion resistance properties and that enables molten iron to prolong a tapping time and occurrence of difficult drilling to be minimized.

SUMMARY OF THE INVENTION

The present inventors have found that an increased content of fixed carbon in a coal tar for use as a binder contributes to reinforced carbon bonding in a taphole mix for a molten metal taphole, thus leading to improved wear resistance. The present invention has been completed in light of this finding.

More specifically, the taphole mix for use in a molten metal taphole according to the invention is characterized in that such taphole mix comprises a refractory base material in an amount of 65 to 92 wt % and a binder in an amount of 8 to 35 wt %, the binder consisting of an anhydrous coal tar having a fixed carbon content of 32.5 wt % or above.

DETAILED DESCRIPTION OF THE INVENTION

In the taphole mix for a molten metal taphole provided in accordance with the present invention, the anhydrous coal tar for use as a binder is dehydrated and has a fixed carbon content of 32.5 wt % or above, preferably of over 34 wt %. When kneading properties and chargeability are taken into consideration, it is desirable that the viscosity of the anhydrous coal tar be adjusted to be from 600 to 1,600 cp, at 60° C., preferably to from 800 to 1,400 cp. The amount of the anhydrous coal tar to be added may be varied based on both the chargeability to be performed and the capacity of the mud gun to be used. In general, an amount of 8 to 35 wt % is sufficient to achieve the desired results.

In addition, in the taphole mix according to the invention, the refractory base material is composed of a carbonaceous material, a silicon carbide, a silicon nitride-based material, a refractory material and a clay. Here, the carbonaceous material is selected from graphite, coal coke, petroleum coke, coal pitch and the like. Such carbonaceous material is added to protect the resultant blocking material against the penetration of slag and oversintering. The amount of carbonaceous material to be used should be in the range of 3 to 20 wt % based on the total weight of the refractory base material. Amounts of smaller than 3 wt % make the finished taphole mix less resistant to slag penetration and prone to oversintering, and this poses a problem in that drilling becomes difficult. Conversely, amounts of larger than 20 wt % produce a sharp decline in strength, and make it difficult to obtain a dense structure.

Next, the silicon carbide according to the invention is added so as to attain improved corrosion resistance. The silicon carbide should be used in an amount in the range of 5 to 50 wt % based on the total weight of the refractory base material. Less than 5 wt % does not effectively improve corrosion resistance, while more than 50 wt % lowers the strength and makes good wear resistance difficult to obtain.

Further, the silicon nitride-based material according to the invention is also added to improve corrosion resistance and should be used in an amount ranging from 5 to 45 wt % based on the total weight of the refractory base material. Less than 5 wt % is ineffective in improving corrosion resistance to the desired amount, while more than 45 wt % makes obtaining a dense structure difficult, and is not cost effective in terms of improving corrosion resistance. The silicon nitride-based material includes, for example, silicon nitride, Ferro-silicon nitride and the like.

Further, the refractory base material according to the present invention should be incorporated with one or more refractory materials selected from ROSEKI, chamotte, alumina, spinel and magnesia ranging in amount of from 3 to 75 wt % based on the total weight of the refractory base material. Less than 3 wt % does not bring about the desired lowered porosity, whereas more than 75 wt % deteriorates resistance to both corrosion and slag intrusion.

In addition, the refractory base material according to the invention is incorporated with a clay such that the shape plasticity and lubricating effect required for chargeability can be obtained. The clay is chosen from KIBUSHI (Knot) clay, GAIROME clay, bole clay and the like. The clay component should be used in an amount of 3 to 20 wt % based on the total weight of the refractory base material. Less than 3 wt % impairs chargeability, while more than 20 wt % greatly reduces corrosion resistance.

The taphole mix for a molten metal taphole according to the present invention can be obtained from adding an anhydrous coal tar as a binder having a fixed carbon content of 32.5 wt % or more to a conventional refractory base material. When the taphole mix is subjected, while in use, to a sintering process at a furnace temperature generated around the taphole, such anhydrous coal tar permits fixed carbon to remain in an amount larger than in conventional practice so that carbon bonding can be reinforced in the taphole mix. As a consequence, the taphole mix's strength over a range of from a low-temperatures to a high-temperatures can be improved, thereby noticeably enhancing resistance to wear from molten iron and slag. Moreover, this increases the amount of carbon uniformly distributed inside the taphole mix which enables the taphole mix to be made structurally dense, so that corrosion resistance is improved and the tapping time of molten iron can be prolonged. In addition, since the strength can be improved even at a low-temperatures, the difference in strength is made small at both high- and low-temperatures so that occurence of cracking during drilling, and hence, difficult drilling is minimized.

The present invention are illustrated with reference to the following examples, but the invention is not intended to be limited thereto.

EXAMPLE 1

An anhydrous coal tar A with 33% fixed carbon content (1,100 cp viscosity at 60° C.) was incorporated in the composition of Example 1 as shown in Table 1 below, and the entire mixture was kneaded at 50° C. in a mixer. In this way, a taphole mix for use in a molten metal taphole was produced which was within the scope of the invention.

Comparative Example 1

The same refractory base material used in Example 1 was used provided that coal tar A was replaced with an anhydrous coal tar with 30% fixed carbon content (300 cp viscosity at 60° C.), and the entire mixture was kneaded at 50° C. in a mixer. Thus, there was produced a taphole mix for use in a molten metal taphole for comparative purposes.

EXAMPLE 2

An anhydrous coal tar B with 35% fixed carbon content (1,400 cp viscosity 60° C.) was incorporated in the composition of Example 1 as shown in Table 1 below, and the entire mixture was kneaded at 50° C. in a mixer. In this way, a taphole mix for use in a molten metal taphole was produced which was within the scope of the invention.

Comparative Example 2

The same refractory base material used in Example 2 was used provided that coal tar B was replaced with an anhydrous coal tar with 30% fixed carbon content (300 cp viscosity at 60° C.), and the entire mixture was kneaded at 50° C. in a mixer. Thus, there was produced a taphole mix for use in a molten metal taphole for comparative purposes.

The test specimens used to determine the physical properties tabulated in Table 1 were obtained by molding a block with dimensions of 40×40×160 mm at a molding pressure of 4.9 MPa and then calcinating the block in a reducing atmosphere for 3 hours at 800° C. or 1,500° C.

Corrosion resistance testing was conducted according to a rotary arc oven-type corrosion testing method, under a reducing atmosphere at 1,550° C. for 10 hours and using pig iron and slag as a corrosive. This was followed by cutting the test piece and measuring the resultant corrosion dimension. The index of loss by melting tabulated in Table 1 is for when the corrosion dimension of the taphole mix for a molten metal taphole obtained in Comparative Example 1 is taken as 100.

Additionally, the results of field testing indicate an average length of time in which iron discharging could continue and an average ratio in which difficult drilling took place when each of the taphole mixes for a molten metal taphole obtained in Comparative Examples 1 and 2 and in Examples 1 and 2 were tested at a taphole of a commercial blast furnace.

TABLE 1

|  | Comparative Example 1 | Example 1 | Comparative Example 2 | Example 2 |
|---|---|---|---|---|
| Formulation (wt %) | | | | |
| ROSEKI (≦3 mm) | 8 | 8 | 5 | 5 |
| alumina (≦3 mm) | 22 | 22 | 27 | 27 |
| silicon carbide (≦2 mm) | 15 | 15 | 11 | 11 |
| silicon nitride | 12 | 12 | 23 | 23 |
| coke (≦1 mm) | 12 | 12 | 8 | 8 |
| pitch powder | 2 | 2 | — | — |
| KIBUSHI clay | 12 | 12 | 10 | 10 |
| anhydrous coal tar (fixed carbon 30%) | 17 | — | 16 | — |
| anhydrous coal tar A (fixed carbon 33%) | — | 17 | — | — |
| anhydrous coal tar B (fixed carbon 35%) | — | — | — | 16 |
| Modulus of Rupture (MPa) | | | | |
| 800° C./3 hour | 4 | 9 | 5 | 12 |
| 1500° C./3 hour | 11 | 15 | 13 | 19 |
| Apparent porosity (%) | | | | |
| 800° C./3 hour | 26 | 24 | 25 | 22 |
| 1500° C./3 hour | 30 | 26 | 29 | 24 |
| Corrosion Test: | | | | |
| Index of loss by melting | 100 | 87 | 58 | 49 |
| Field Test | | | | |
| Average time of tapping (min/run) | 163 | 189 | 201 | 243 |
| Occurrence of difficult drilling (%) | 11 | 7 | 10 | 5 |

As is clear from Table 1 above, compared to the comparative taphole mix product, the taphole mix product according to the present invention display a remarkable improvement in strength over a range of from low-temperatures to high-temperatures, and has a dense structure and high corrosion resistance. Therefore, when applied to a commercial furnace, the taphole mix of the invention is capable of prolonging tapping time of molten iron and reduces the ratio of difficult drilling operations that occur.

The taphole mix for a molten metal taphole according to the present invention has a small difference in strength between low- and high-temperatures and thus shows considerable improvements in wear resistance and corrosion resistance, thereby making it possible to minimize the difficulty in drilling operations and prolong the tapping time for iron discharge. Hence, such taphole mix is suitable for use in a taphole in a blast furnace, an electric furnace and the like.

What is claimed is:

1. A taphole mix for use in a molten metal taphole, comprising a refractory base material in an amount of 65 to 92% by weight and a binder in an amount of 8 to 35% by weight, said binder consisting of an anhydrous coal tar having a fixed carbon content of 32.5% or more by weight.

2. A taphole mix for use in a molten metal taphole as defined in claim 1, wherein said refractory base material comprises a carbonaceous material in an amount of 3 to 20% by weight, a silicon carbide in an amount of 5 to 50% by weight, a silicon nitride-based material in an amount of 5 to 45% by weight, clay in an amount of 3 to 20% by weight and a refractory material in an amount of 3 to 75% by weight, said refractory material being at least one selected from the group consisting of ROSEKI, chamotte, alumina, spinel and magnesia.

* * * * *